US012688077B2

(12) United States Patent
Grushka et al.

(10) Patent No.: US 12,688,077 B2
(45) Date of Patent: Jul. 21, 2026

(54) COMPUTING RESOURCE PREDICTION FOR OPTIMIZING RESOURCE UTILIZATION AND COMPUTING WORKLOAD DENSITY

(71) Applicant: MICROSOFT TECHNOLOGY LICENSING, LLC, Redmond, WA (US)

(72) Inventors: Hagit Grushka, Beer-Sheva (IL); Rachel Lemberg, Herzliya (IL); Jeremy Samama, Herzliya (IL); Eliya Habba, Petah Tikva (IL); Yaniv Lavi, Tel Aviv-Jaffa (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 745 days.

(21) Appl. No.: 17/733,075

(22) Filed: Apr. 29, 2022

(65) Prior Publication Data

US 2023/0259408 A1 Aug. 17, 2023

Related U.S. Application Data

(60) Provisional application No. 63/310,026, filed on Feb. 14, 2022.

(51) Int. Cl.
*G06F 9/50* (2006.01)

(52) U.S. Cl.
CPC .......... *G06F 9/5083* (2013.01); *G06F 9/5038* (2013.01); *G06F 9/5044* (2013.01); *G06F 9/505* (2013.01); *G06F 2209/508* (2013.01)

(58) Field of Classification Search
CPC .... G06F 9/5083; G06F 9/5038; G06F 9/5044; G06F 9/505; G06F 2209/508
See application file for complete search history.

(56) References Cited

U.S. PATENT DOCUMENTS 7,320,131 B1 * 1/2008 O'Toole, Jr. ............ G06F 9/505
709/224
8,312,460 B1 * 11/2012 Blanding ................ G06F 9/505
718/104
(Continued)

FOREIGN PATENT DOCUMENTS

CN 108920153 A 11/2018
CN 111045820 A 4/2020
(Continued)

OTHER PUBLICATIONS

Mehmood et al.; "Prediction Of Cloud Computing Resource Utilization"; IEEE 2018; (Mehmood_2018.pdf) (Year: 2018).*
(Continued)

*Primary Examiner* — Hiren P Patel
(74) *Attorney, Agent, or Firm* — Newport IP, LLC; Jacob P. Rohwer

(57) ABSTRACT

The techniques disclosed herein enable systems to efficiently allocate computing resources for various computing workloads through a shared peak resource usage prediction. To achieve this, a predictive model analyzes a historical dataset defining resource usage of a computing environment for a past timeframe, and calculates a peak environment resource usage for a future or current timeframe. In addition, the predictive model estimates a peak number of computing workloads for the computing environment. Using the peak resource usage and/or the peak number of computing workloads, the system derives resource requests for allocating computing resources to a plurality of computing workloads. The computing workloads are subsequently assigned to computing nodes within the computing environment for execution. Furthermore, computing workloads within a computing node are configured to share computing resources to accommodate sudden surges in demand. In this (Continued)

way, the system can reduce computing resource wastage for computing environments.

20 Claims, 8 Drawing Sheets

(56)                References Cited

U.S. PATENT DOCUMENTS

| | | | | |
|---|---|---|---|---|
| 8,547,840 | B1 * | 10/2013 | Kumar | H04L 67/61 |
| | | | | 370/395.42 |
| 8,914,797 | B2 | 12/2014 | Osogami et al. | |
| 9,953,276 | B2 * | 4/2018 | Gaurav | G06Q 10/04 |
| 9,983,908 | B1 * | 5/2018 | Cropper | G06F 9/45558 |
| 10,484,301 | B1 * | 11/2019 | Shukla | G06F 3/0605 |
| 10,572,306 | B2 * | 2/2020 | Kambatla | G06F 9/5077 |
| 10,719,364 | B2 | 7/2020 | Martin et al. | |
| 10,735,278 | B1 * | 8/2020 | Fakhouri | H04L 41/5012 |
| 10,901,788 | B2 * | 1/2021 | Venkadasamy | G06F 11/3024 |
| 11,221,887 | B2 * | 1/2022 | Gabrielson | G06F 9/5038 |
| 11,321,181 | B2 * | 5/2022 | Kottomtharayil | G06F 9/505 |
| 12,393,468 | B2 * | 8/2025 | Jasleen | G06N 20/00 |
| 2009/0007125 | A1 * | 1/2009 | Barsness | G06F 9/5077 |
| | | | | 707/999.002 |
| 2012/0284408 | A1 * | 11/2012 | Dutta | G06F 9/5083 |
| | | | | 709/226 |
| 2013/0042005 | A1 * | 2/2013 | Boss | H04L 43/0876 |
| | | | | 709/226 |
| 2013/0173804 | A1 * | 7/2013 | Murthy | G06F 9/5022 |
| | | | | 709/226 |
| 2013/0263117 | A1 * | 10/2013 | Konik | G06F 9/45558 |
| | | | | 718/1 |
| 2014/0373010 | A1 * | 12/2014 | Folco | G06F 9/45533 |
| | | | | 718/1 |
| 2018/0067769 | A1 * | 3/2018 | Stich | G06F 9/5083 |
| 2018/0074855 | A1 * | 3/2018 | Kambatla | G06F 9/5038 |
| 2018/0129541 | A1 * | 5/2018 | Alshinnawi | H04L 41/40 |
| 2019/0158417 | A1 * | 5/2019 | Aronovich | H04L 47/83 |
| 2019/0250949 | A1 * | 8/2019 | Chen | H04L 47/83 |
| 2020/0371896 | A1 * | 11/2020 | Mathur | G06F 11/3006 |
| 2021/0320981 | A1 * | 10/2021 | Elbert | H04L 67/306 |
| 2021/0334713 | A1 * | 10/2021 | Edgar | G06Q 10/04 |
| 2021/0360295 | A1 | 11/2021 | Sze et al. | |
| 2023/0281052 | A1 * | 9/2023 | Zad Tootaghaj | G06F 9/505 |
| | | | | 718/104 |

FOREIGN PATENT DOCUMENTS

| | | |
|---|---|---|
| CN | 111190790 A | 5/2020 |
| CN | 113485833 A | 10/2021 |
| WO | 2021104096 A1 | 6/2021 |

OTHER PUBLICATIONS

Pace et al.; "A Data-Driven Approach to Dynamically Adjust Resource Allocation for Compute Clusters"; arXiv:1807.00368v1 [cs.DC] Jul. 1, 2018; (Pace_2018.pdf) (Year: 2018).*

Baig et al.; "Adaptive Prediction Models for Data CenterResources Utilization Estimation"; IEEE Transactions on Network and Service Management, vol. 16, No. 4, Dec. 2019; Digital Object Identifier 10.1109/TNSM.2019.2932840; (Baig_2019.pdf) (Year: 2019).*

"Resource Management for Pods and Containers", Retrieved From <<https://web.archive.org/web/20220111221714/ https:/kubernetes.io/docs/concepts/configuration/manage-resources-containers/>>, Jan. 11, 2022, 11 Pages.

Rausch, et al., "Optimized Container Scheduling for Data-Intensive Serverless Edge Computing", In Journal of Future Generation Computer Systems, vol. 114, Aug. 17, 2020, 16 Pages.

Xu, et al., "Prophet: Scheduling Executors with Time-varying Resource Demands on Data-Parallel Computation Frameworks", In IEEE International Conference on Autonomic Computing, Jul. 17, 2016, 10 Pages.

Bashir, et al., "Take it to the Limit: Peak Prediction-driven Resource Overcommitment in Datacenters", In Proceedings of the Sixteenth European Conference on Computer Systems, Apr. 26, 2021, pp. 556-573.

"International Search Report and Written Opinion Issued in PCT Application No. PCT/US22/051029", Mailed Date: Feb. 27, 2023, 12 pages.

* cited by examiner

COMPUTING RESOURCE PREDICTION FOR OPTIMIZING RESOURCE UTILIZATION AND COMPUTING WORKLOAD DENSITY

PRIORITY APPLICATION

The present application is a non-provisional application of, and claims priority to, U.S. Provisional Application Ser. No. 63/310,026 filed on Feb. 14, 2022, the contents of which are hereby incorporated by reference in their entirety.

BACKGROUND

As cloud computing gains popularity, more and more data and/or services are stored and/or provided online via network connections. Providing an optimal user experience at a large scale is an important aspect for cloud-based computing platforms that offer network services. In many scenarios, a cloud-based platform may provide a service to thousands or millions of users (e.g., customers, clients, tenants) geographically dispersed around a country, or even the world. In order to provide this service, a cloud-based platform often includes different resources, such as server farms containing clusters and nodes, hosted in various datacenters. In addition, the platform can be constructed using various software components which can enable users to build and host their own platforms and services.

To effectively manage a large-scale computing platform such as a cloud service, many providers utilize orchestration systems such as Kubernetes to handle the deployment and scaling of software. Such systems are crucial for maintaining stability and reliability in cloud-based computing platforms as thousands and even millions of software deployments may be active at a given time. In general, an orchestration system coordinates active software deployments across computing resources (e.g., nodes within a cluster) based on the availability of those computing resources as well as a resource requirement request of each software deployment.

SUMMARY

The disclosed techniques improve the functionality of computing platforms by the introduction of a resource requirement prediction using a shared estimator approach for orchestration systems. Generally, the system can analyze a computing environment to extract a historical dataset that describes various characteristics of the computing environment such as resource allocation, utilization, and density. The computing environment may be organized in to computing nodes that contain and execute various computing workloads. In one example, the computing environment is a Kubernetes cluster that contains various nodes that house groups of containers that represent computing workloads. In another example, the computing environment is a group of servers in a datacenter where an individual computing node is a single server that executes virtual machines which are the computing workloads. In various examples, the historical dataset is generated by analyzing the computing environment for a specific timeframe prior to the current point in time (e.g., a past timeframe).

The historical dataset can be analyzed by a predictive model to calculate a peak resource usage of the overall computing environment. Resources refer to any virtual or physical components that enable or execute a software deployment such as computing cores, storage, or memory (e.g., random-access memory ("RAM")). The peak resource usage may serve as a predicted peak resource usage at any given time within a future timeframe. In addition, the predictive model may also predict a peak number of computing workloads to be implemented at a particular time in the future timeframe. It should be understood that the time at which resource usage peaks may not necessarily coincide with the time at which the number of computing workloads peaks. Furthermore, the predictive model can utilize any suitable approach such as a prophet model, a greedy algorithm, machine learning, statistical modelling, and so forth.

Based on the predicted peak resource usage and/or the predicted peak number of computing workloads, the system can derive a resource request for each of a plurality of pending computing workloads. In a specific example, the predicted peak resource usage is divided by the predicted peak number of computing workloads to derive a resource request for each computing workload. In this way, the predicted peak resource usage is shared amongst all the computing workloads and the system is enabled to account for varying peaks in activity at individual computing workloads.

Using the resource requests generated from the predicted peak resource usage and/or the peak number of computing workloads, the computing environment can allocate computing resources for each of the pending computing workloads. Accordingly, the pending computing workloads can be assigned to various computing nodes within the computing environment for execution. In various examples, the computing workloads are assigned to the computing environment by a scheduler that is configured in various ways which are further discussed below.

The disclosed techniques address several challenges that arise in the management of cloud-based computing platforms. For example, as mentioned above, while orchestration systems greatly alleviate the burden of managing software deployments, the orchestration systems typically rely upon resource requests that are manually configured according to a rough estimate of each computing workload's needs. As such, to prevent resource starvation, these resource requests typically far exceed the actual needs of the computing workload. Unfortunately, configuring computing environments in this way frequently leads to low resource utilization as well as low resource availability. Stated another way, as resource requests typically overestimate requirements to ensure smooth operation, a large amount of computing resources goes unused, thereby causing an increased environmental footprint, excessive operating costs, and/or lost revenue.

To combat low utilization, many cloud service providers utilize various predictive techniques such as machine learning to configure each computing workload with adequate resource allocations often referred to as rightsizing. In typical rightsizing systems, a resource request engine may predict a maximal resource need for a specific computing workload (e.g., a container or a virtual machine). By estimating the maximum resource requirement for the computing workload, the system can allocate all the necessary resources to prevent resource starvation for that computing workload in the worst-case scenario (e.g., when the computing workload experiences peak activity).

Unfortunately, estimating requirements and allocating resources on a per computing workload basis fails to fully remedy low utilization and density caused by overallocation of computing resources. Stated another way, not all computing workloads within a given computing environment are expected to experience peak activity at the same time. As such, by allocating resources based on the maximal need of each computing workload, a significant portion of computing resources remains unused at any given time because a limited number of computing workloads (e.g., one, two, three, four) typically experience peak activity at the same time. In addition, this inefficiency can be exacerbated by computing workload behavior as times of peak activity can tend to be sporadic and short in duration.

In contrast to existing solutions, the disclosed system provides resource requests that reduce resource wastage and increase computing workload density. For instance, as mentioned above, resource requests that are generated based on a maximum resource usage for each computing workload can fail to account for behaviors such as varying times of peak activity for various computing workloads. Again, this causes a significant amount of unutilized resources. To accommodate varying peak times for individual computing workloads, the disclosed system can derive resource requests from a peak resource usage for the whole computing environment. In this way, the total resources allocated by the resource requests can be reduced, thereby enabling increased resource utilization improved efficiency for individual computing workloads.

In addition, the system can be configured to dynamically reallocate resources as computing workloads execute within the computing environment. For example, a computing workload may experience an unexpectedly heavy surge in activity requiring more than its allocated computing resources. Because the disclosed system can account for varying peak times for individual computing workloads, an adjacent computing workload may be experiencing low activity and thus low resource utilization. Accordingly, the system can reallocate or share available resources from the low utilization computing workload to assist the high utilization computing workload.

As another example of the technical benefit of the present disclosure, deriving resource allocations from the peak usage of the computing environment configured to enable increased workload density within the computing environment. For example, allocating resources to each computing workload configured to reduce the overall allocation of resources. As such, the system is configured to fit a greater number of computing workloads within a given computing environment in comparison to existing approaches. By increasing computing workload density, an operator of the computing platform can maximize the return on their investment in computing infrastructure while providing a seamless user experience.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The techniques described herein provide systems for enhancing the functionality of computing platforms by the introduction of a shared estimator approach to resource request generation. As mentioned above, the system is configured to extract a historical dataset from a computing environment which can then be used to predict a peak environment resource usage. From the peak environment resource usage, the system is configured to generate resource requests for individual computing workloads.

The disclosed system addresses several technical problems associated with resource allocation for computing workloads. For instance, as discussed above, many systems for automatic resource allocation focus on peak resource usage for individual computing workloads to generate resource requests, without considering the whole computing environment within which the computing workloads are executing. This approach can lead to overallocation of resources and low utilization of computing infrastructure. In contrast, the disclosed system predicts a peak resource usage for a whole computing environment (e.g., a Kubernetes cluster) for a future point in time and derives individual resource requests accordingly. In this way, the disclosed system is configured to mitigate overallocation thereby improving resource utilization and reducing the amount of unused computing infrastructure.

In addition, the disclosed system is configured to be configured to account for differing times of peak activity for various computing workloads executing within a computing environment. As such, computing workloads that are likely to experience overlapping times of peak activity can be assigned to different computing nodes. Stated another way, computing workloads can be assigned to computing nodes such that peak workload utilizations within a computing node do not overlap. By organizing computing workloads in this way, the system is configured to dynamically reallocate computing resources to various computed workloads as needed to accommodate unexpected circumstances (e.g., an unexpected surge in activity).

Various examples, scenarios, and aspects that enable a shared estimator approach for deriving resource requests are described below with respect to FIGS. 1-8.

Figure 1:
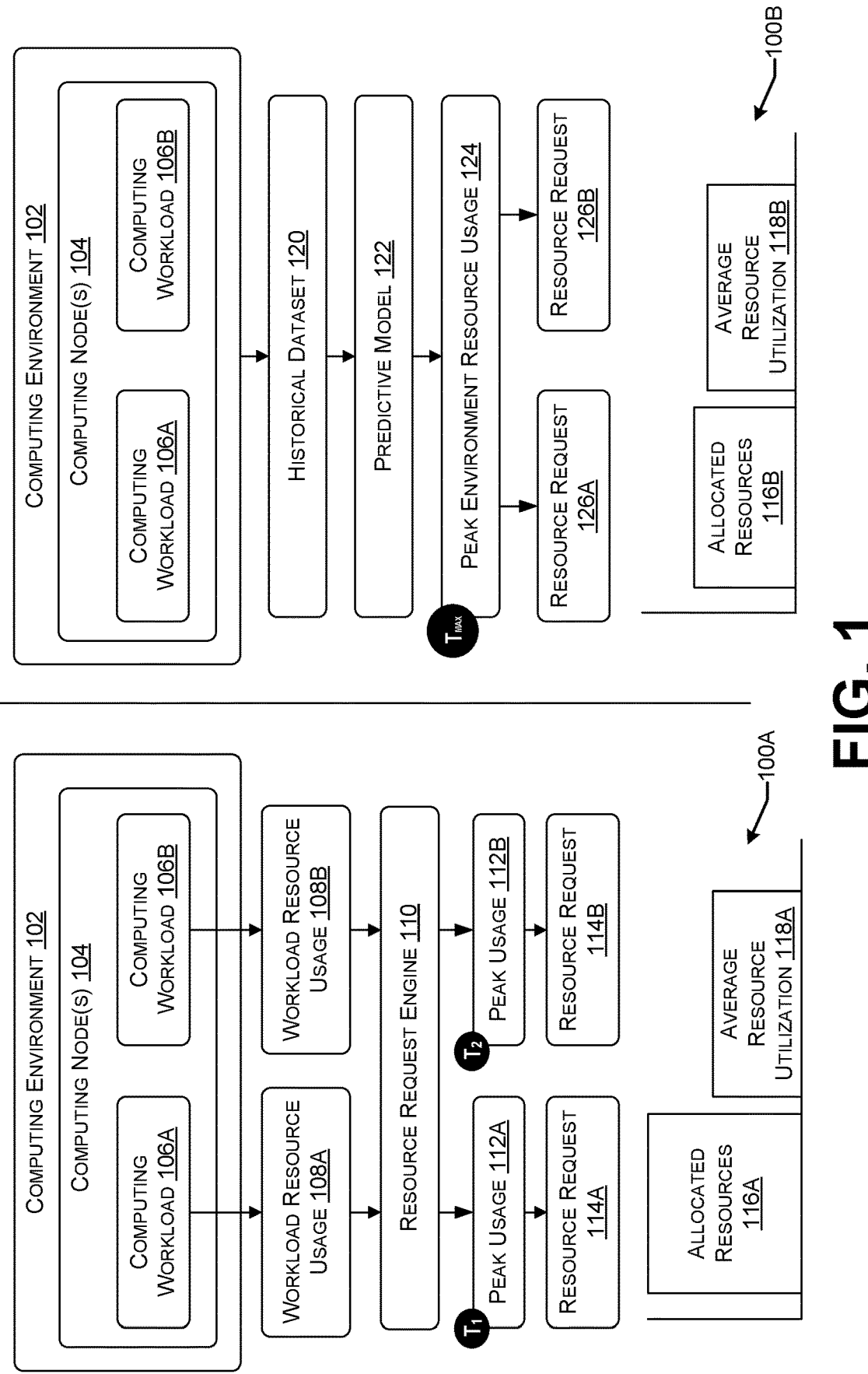
FIG. 1 is a block diagram comparing and contrasting a system for deriving resource requests from a peak computing environment resource usage against a conventional approach that determines resource requests from peak computing workload resource usage.

FIG. 1 illustrates an example environment 100A in which a computing environment 102 is analyzed for allocating computing resources. As noted above, resources include any virtual or physical components that enable or execute a software deployment such as computing cores, storage, or memory (e.g., random-access memory ("RAM")). The computing environment 102 includes computing nodes 104 that execute computing workloads 106A and 106B. A computing workload includes program code or software for execution. In one example, the computing environment 102 is a Kubernetes cluster in which the computing node 104 is a node within the cluster and the computing workloads 106A and 106B are containers. In another example, the computing environment 102 is a group of servers in a datacenter where an individual computing node 104 is a single server and the computing workloads 106A and 106B are virtual machines.

As illustrated on the left-hand portion of FIG. 1, a conventional approach is shown where workload resource usages 108A and 108B are extracted from corresponding computing workloads 106A and 106B. The workload resource usages 108A and 108B describe how the computing workloads 106A and 106B utilize resources within the computing node 104 in the past (e.g., prior to extracting the workload resource usages 108). The workload resource usages 108A and 108B can be provided to a resource request engine 110. Based on the workload resource usages 108A and 108B, the resource request engine 110 can determine peak usages 112A and 112B for the respective computing workloads 106A and 106B. Most often, peak usage 112A can occur at a point in time $T_1$, while peak usage 112B may occur at a different point in time $T_2$.

In the conventional approach, the peak usages 112A and 112B can be translated directly into resource requests 114A and 114B. In a specific instance, peak usage 112A indicates that computing workload 106A is most likely to consume a maximum of eight gigabytes of RAM. Accordingly, the corresponding resource request 114A requests an allocation of eight gigabytes of RAM for computing workload 106A at the computing node 104 for a future timeframe.

In various examples, the sum of computing resources reserved by the resource requests 114A and 114B is expressed as the allocated resources 116A. Similarly, the total resource usage of the computing workloads 106A and 106B can be collectively referred to as the average resource utilization 118A. As shown in the plot at the bottom of the left-hand side of FIG. 1, a significantly greater amount of computing resources is allocated 116A to the computing workloads 106A and 106B than is actually utilized 118A by the computing workloads 106A and 106B. This is due to allocating computing resources based on the peak usages 112A and 112B for computing workload 106A and 106B individually. A basic assumption of this conventional approach is that all computing workloads experience peak activity at the same time (e.g., the worst-case scenario). However, in practicality, the likelihood of peak usage 112A at time $T_1$ and peak usage 112B at time $T_2$ overlapping is extremely limited. In exchange for covering this worst-case scenario, a large portion of computing resources is wasted leading to excessive energy usage, elevated operating costs, and/or lost revenue.

In contrast, as illustrated in the environment 100B on the right-hand side of FIG. 1, the disclosed system is configured to extract a historical dataset 120 that defines the computing resource usage of the whole computing environment 102 rather than individual computing workloads 106A and 106B. In this way, the historical dataset 120 can provide insight to large scale tendencies of the entire group of computing workloads 106A and 106B executing on computing node(s) 104 within the computing environment 102. This insight can lead to improvements to the average resource utilization 118A. In various examples, the historical dataset 120 is gathered for a predetermined period of time prior to the present time (e.g., current time). For instance, the historical dataset 120 defines computing resource usage for the past forty-eight hours. However, any suitable time period may be selected for the historical dataset 120.

In one example, the computing environment 102 is configured to provide an online shopping platform. Accordingly, the historical dataset 120 defines computing resource usage as a result of online traffic to the shopping platform. In anticipation of periods of high shopping traffic such as Black Friday (i.e., the day after Thanksgiving), the system is configured to extract a historical dataset 120 for a past timeframe that covers a previous Black Friday (e.g., a previous year).

The historical dataset 120 can be provided to a predictive model 122 to calculate a peak environment resource usage 124 at a time $T_{max}$. In various examples, the predictive model 122 is a prophet model that aims to lower the sum of the resource requests 114A and 114B illustrated on the left side of FIG. 1. It should be understood that the predictive model 122 can utilize any suitable data-driven model for calculating the peak environment resource usage 124. Similar to the peak usages 112A and 112B of the individual computing workloads 106A and 106B, as discussed above, the peak environment resource usage 124 defines a predicted maximum resource usage at a point in time $T_{max}$ within a future timeframe. In a specific example, the peak environment resource usage 124 indicates that the computing environment 102 will require a maximum of 128 computing cores based on the historical dataset 120 at time $T_{max}$.

Accordingly, the system is configured to then derive resource requests 126A and 126B for the respective computing workloads 106A and 106B. In contrast to the resource requests 114A and 114B illustrated on the left side of FIG. 1, the resource requests 126A and 126B can be calculated based on the peak environment resource usage 124. For instance, the resource requests 126A and 126B are generated by dividing the peak environment resource usage 124 by the number of computing workloads that are to be deployed to the computing environment 102 (e.g., two computing workloads, three computing workloads, five computing workloads, ten computing workloads, one hundred computing workloads).

As shown in the plot at the bottom of the right-hand side of FIG. 1, calculating resource requests 126A and 126B in this way can tailor the allocated resources 116B to the realistic needs of the computing environment 102. In many scenarios, this can manifest as a reduction in allocated resources 116B for the same number of computing workloads 106A and 106B. As a result, the average resource utilization 118B, in proportion to the allocated resources 116B, can be much greater compared to the conventional approach illustrated in the environment 100A on the left-hand side of FIG. 1.

Figure 2:
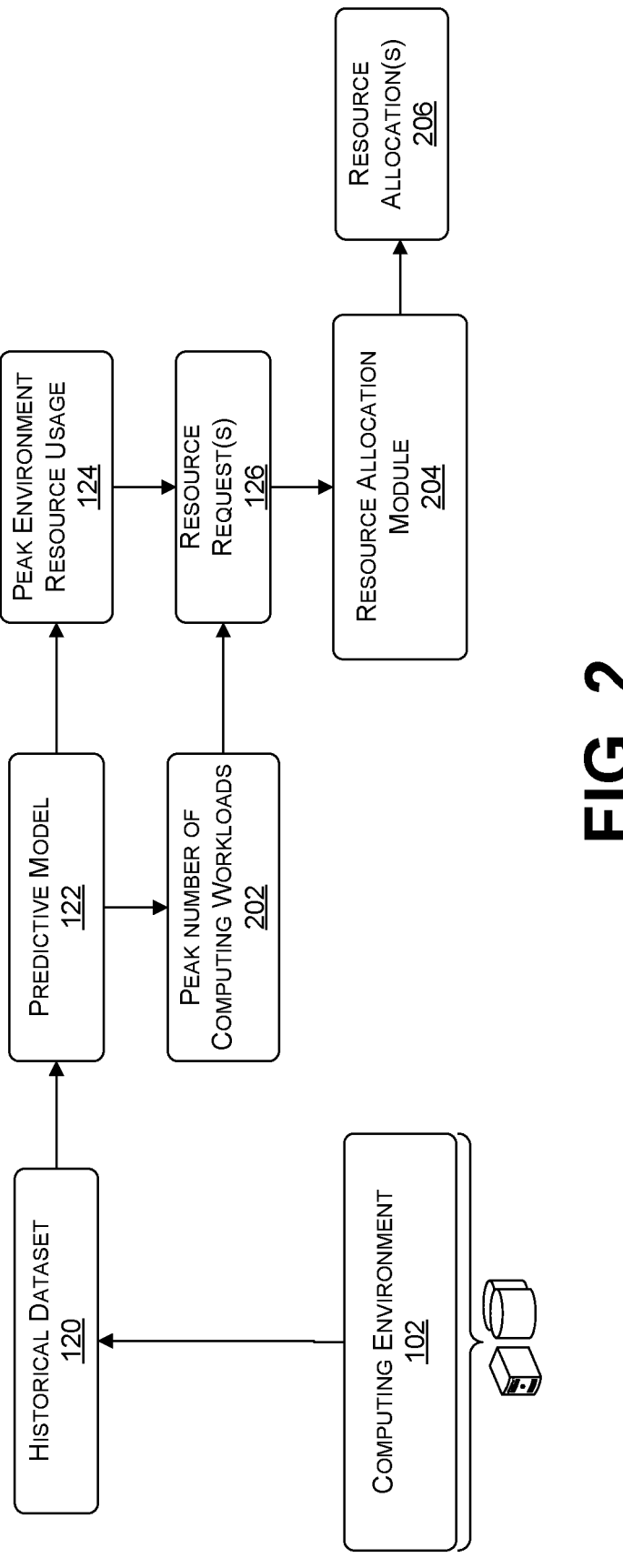
FIG. 2 illustrates additional aspects of the system for deriving resource requests from a peak computing environment resource usage.

Turning now to FIG. 2, additional aspects of the system for deriving resource requests 126 from a peak environment resource usage 124 are shown and described. As mentioned above, the predictive model 122 is configured to calculate a peak environment resource usage 124 based on the historical dataset 120. In some configurations, the predictive model 122 is further enabled to calculate a peak number of computing workloads 202 in addition to the peak environment resource usage 124. Accordingly, both the peak environment resource usage 124 and the peak number of computing workloads 202 can be used to calculate the resource requests 126. In various examples, the resource requests 126 are calculated by dividing the peak environment resource usage 124 by the peak number of computing workloads 202.

In a specific example, the peak environment resource usage 124 indicates a peak memory usage of one hundred gigabytes for the computing environment 102. In addition, the peak number of computing workloads 202 can be one hundred. By dividing the peak environment resource usage 124 by the peak number of computing workloads 202, the resultant resource request 126 is one gigabyte of memory per computing workload 202. Similar calculations can be performed for any other computing resource such as computing cores, storage, and the like. It should also be understood that the division operation discussed above is merely for the sake of discussion and that any suitable operation can be used to derive resource requests 126 from the peak environment resource usage 124.

The resource requests 126 may be provided to a resource allocation module 204 which can generate a corresponding resource allocation 206 for each resource request 126. As will be discussed below, each resource request 126 can define a requested quantity for a various computing resource. These quantities can then be confirmed and reserved at the computing environment 102 and/or the computing node 104 by the associated resource allocation 206. In various examples, the resource allocation 206 reserves computing cores, memory, and a volume of storage at the computing environment 102 for each associated computing workload 106.

Figure 3:
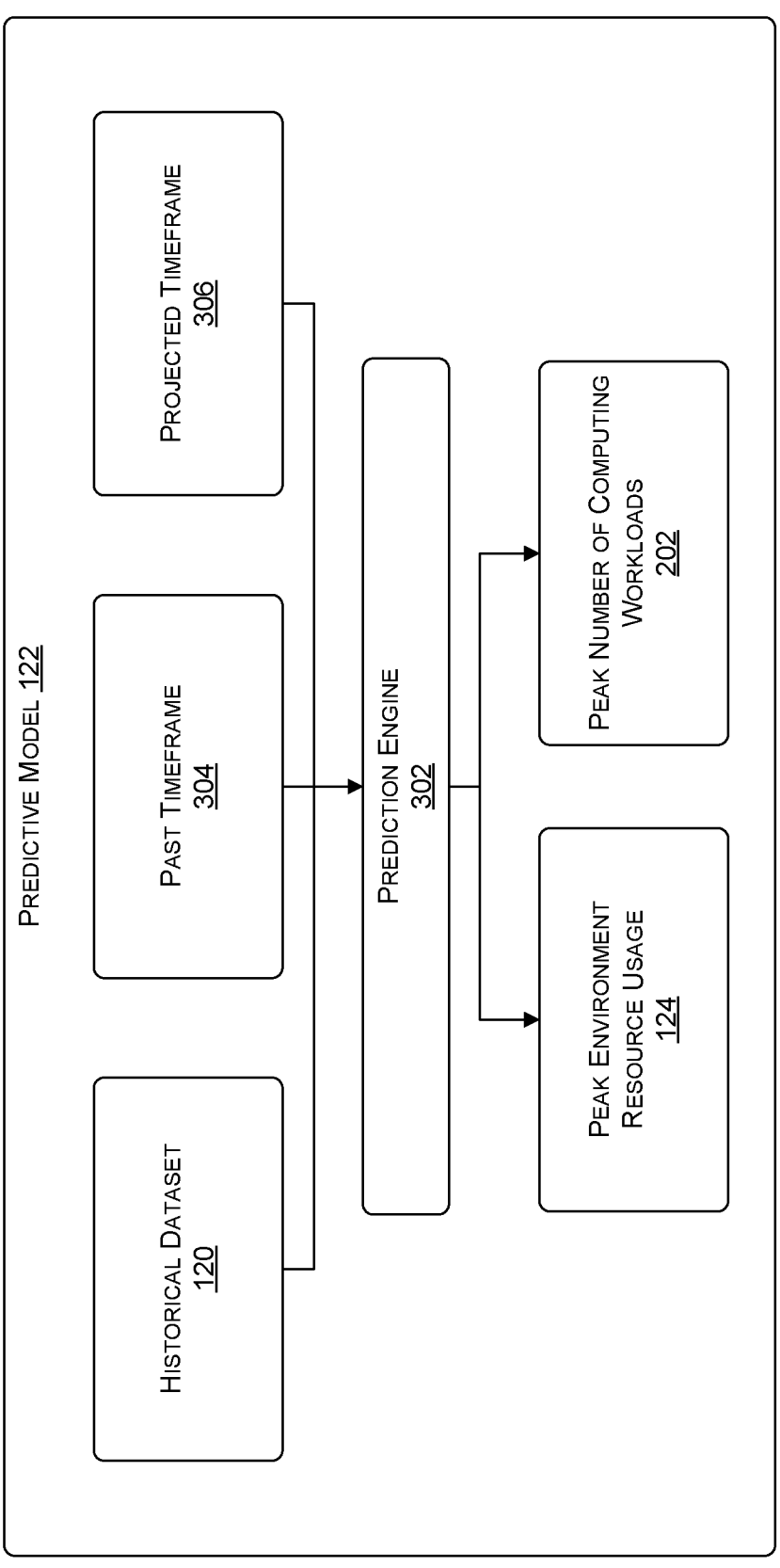
FIG. 3 illustrates aspects of a predictive model used to calculate the peak computing environment resource usage.

Proceeding now to FIG. 3, aspects of the predictive model 122 are shown and described. As mentioned above, the predictive model 122 is configured to analyze the historical dataset 120 to predict the peak environment resource usage 124 and the peak number of computing workloads 202 for a computing environment 102. This can be achieved using a prediction engine 302 that receives the historical dataset 120 as well as supplementary data such as a past timeframe 304 and a projected timeframe 306 (e.g., a current timeframe). In various examples, the past timeframe 304 dictates the duration for which the historical dataset 120 is extracted from the computing environment. In addition, the projected timeframe 306 can define a duration projected from the present point in time (e.g., the next twenty-four hours). It should be understood that the predictive model 122 and the prediction engine 302 can utilize any suitable method of predicting the peak environment resource usage 124 and the peak number of computing workloads 202 for a computing environment 102. For instance, the predictive model 122 can be a prophet model, a greedy algorithm, a machine learning model, and so forth.

In a specific example of the operation of the prediction engine 302, the historical dataset 120 defines all computing resource usage for a computing environment 102. In this example, the past timeframe 304 and the projected timeframe 306 are the same duration or quantity of time. As such, the peak environment resource usage 124 is extracted by directly observing the historical dataset 120 and utilized as a prediction for future peak environment resource usages 124 within the projected timeframe 306.

In other examples, the peak environment resource usage 124 is adjusted by the prediction engine 302 from the trends observed in the historical dataset 120. For instance, the prediction engine 302 is configured with a past timeframe 304 over which the historical dataset 120 is extracted. More specifically, the prediction engine 302 may be configured by the past timeframe 304 to extract a historical dataset 120 for the past seven days. Consider in this example, a projected timeframe 306 of twenty-four hours (e.g., the present extending into the next twenty-four hours). While the prediction engine 302 may initially detect a seven-day peak memory usage of 256 gigabytes for the computing environment 102, this observation can be adjusted to the projected timeframe 306 of twenty-four hours. In some examples, this adjustment results in peak environment resource usage 124 that is lower than the initial observation. Stated another way, while the prediction engine 302 may detect a 256-gigabyte peak memory usage for the seven-day past timeframe 304, the prediction engine 302 may determine that the most likely peak environment resource usage 124 for the next twenty-four hours as set by the projected timeframe 306 is 128 gigabytes. This calculation and adjustment can accordingly be performed for other computing resources such as computing cores and storage as well as the peak number of computing workloads 202. It should be understood that the peak environment resource usage 124 and the peak number of computing workloads 202 can be located at different points in time and may not necessarily align.

Figure 4:
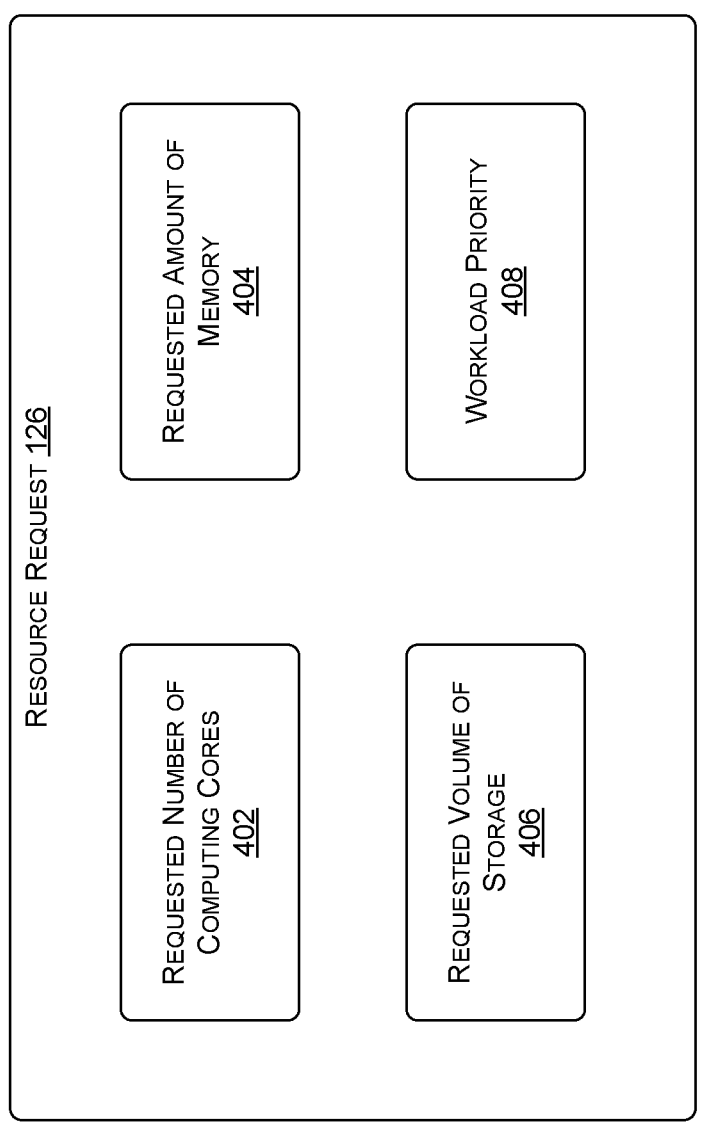
FIG. 4 illustrates aspects of an individual resource request.

Turning now to FIG. 4, aspects of an individual resource request 126 are shown and described. As mentioned above, a resource request 126 defines specific amounts of various computing resources to be reserved at a computing environment 102 for an associated computing workload 106. In various examples, the values defined by the resource request 126 are derived from the peak environment resource usage 124 and/or the peak number of computing workloads 202 as discussed above.

For instance, the resource request 126 includes a request number of computing cores 402. Similar to the examples detailed above, the peak environment resource usage 124 may indicate that the computing environment 102 will require sixty-four computing cores while the peak number of computing workloads 202 can be eight. Accordingly, the requested number of computing cores 402 can be set to eight after evenly dividing the peak environment resource usage 124 among the peak number of computing workloads 202. This operation can be performed for other values defined by the resource request 126 such as the request amount of memory 404 and the requested volume of storage 406.

In addition, the resource request 126 can include a workload priority 408. In some examples, the workload priority 408 is utilized by the resource allocation module 204 to give preference to a computing workload 106A that is designated as high priority in relation to other computing workloads (e.g., computing workload 106B) when allocating computing resources. For example, a high priority computing workload 106A and a low priority computing workload 106B may both request sixteen gigabytes of storage via a respective requested volume of storage 406. However, the computing environment 102 or the computing node 104 may only have availability to fulfill one requested volume of storage 406. As such, the higher priority workload 106A can be given preference to the available memory while the lower priority workload 106B must wait until a later point in time to execute.

In other examples, the workload priority 408 is used to adjust the various values defined by the resource request 126. For example, a higher priority workload 106A may require more memory than initially derived from the peak environment resource usage 124 as described above. Accordingly, the workload priority 408 can increase the requested amount of memory 404 to reserve additional memory for the higher priority workload 106A. In this way, the system can ensure critical computing workloads do not suffer performance degradation while still preventing over-allocation of computing resources.

Figure 5:
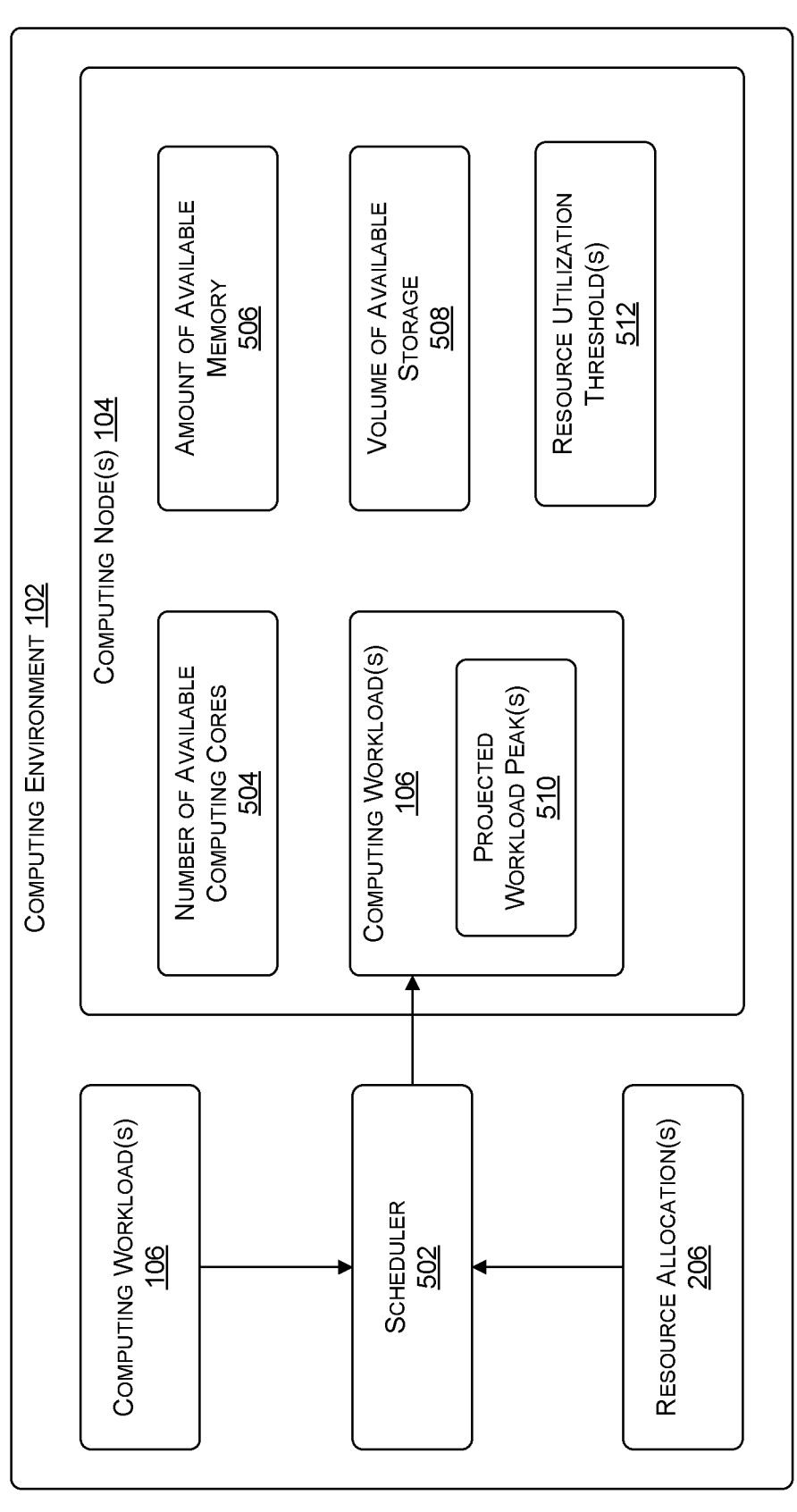
FIG. 5 illustrates various aspects of a computing environment for executing computing workloads.

Proceeding to FIG. 5, aspects of the computing environment 102 are shown and described. Once resource requests 126 are derived from the peak environment resource usage 124 and/or the peak number of computing workloads 202, computing resources can be reserved by various resource allocations 206. Using the resource allocations 206, a scheduler 502 is configured to assign computing workloads 106 for execution within various computing nodes 104 within the computing environment 102. In various examples, a computing node 104 is a single computing device (e.g., a server rack) while a computing environment 102 is a group of many computing devices (e.g., a set of servers in a datacenter). In a specific example, the computing environment 102 is a Kubernetes cluster in which the computing nodes 104 are individual nodes that execute pods which can comprise one or more containers. As such, the computing workloads 106 can be considered pods and/or containers in this particular example.

When assigning computing workloads 106 to various computing nodes 104, the scheduler 502 is configured to consider various characteristics of an individual computing node 104, such as resource availability (e.g., unused and/or unallocated resources) as well as other computing workloads 106 that are already assigned. For example, the scheduler 502 is configured to receive a computing workload 106A and an associated resource allocation 206 indicating that the computing workload 106A requires eight computing cores. Accordingly, the scheduler 502 is configured to check a number of available computing cores 504 to determine if the computing node 104 is configured to support computing workload 106A. This operation can be performed for other resources as well, such as the amount of available memory 506, the volume of available storage 508, and any other relevant computing resources.

In addition, each computing workload 106 can include a projected workload peak 510 defining a point in time when the computing workload 106 is likely to experience peak activity. In a specific example, a computing workload 106A is an enterprise email service. As such, the associated projected workload peak 510 indicates peak activity at the beginning of business hours when most users check and respond to their emails. As such, the scheduler 502 is configured to be configured to also consider projected workload peaks 510 when assigning computing workloads 106 to computing nodes 104 such that peak activity for computing workloads 106 within a single computing node 104 do not overlap.

In some examples, the system is enabled to calculate a likelihood that the projected workload peak 510 for a computing workload 106 will overlap with other computing workload peaks for other computing workloads already assigned to the computing node 104. If the calculated likelihood falls below a threshold likelihood, the computing workload 106 can be assigned to the computing node 104. Alternatively, if the calculated likelihood is above the threshold likelihood, the scheduler 502 is configured to accordingly select a different computing node 104 to which the computing workload 106 is assigned. In this way, the system is configured to eliminate, or at least minimize, the possibility of resource overutilization.

In addition, by assigning computing workloads 106 while considering projected workload peaks 510, the system is configured to enable maximize resource availability within a computing node 104. In this way, the system is configured to accommodate unexpected increases in demand. For instance, while various computing workloads 106 are executing at a computing node 104, the system is configured to track the resource utilization of each computing workload 106 in comparison to a resource utilization threshold 512. During normal operations, the resource utilization of a computing workload 106 may typically rest below the resource utilization threshold 512. However, if the computing workload 106 experiences a surge in activity, the resource utilization of the computing workload 106 can rise above the resource utilization threshold 512. The system is configured to detect this elevated resource utilization and dynamically reallocate resources to enable the computing workload 106 to handle the increased activity. In some examples, another computing workload may have a resource utilization that is below the resource utilization threshold 512 indicating low levels of activity. Accordingly, the system is configured to reallocate some of the computing resources from this other computing workload to assist the computing workload that is currently above the resource utilization threshold 512.

Figure 6:
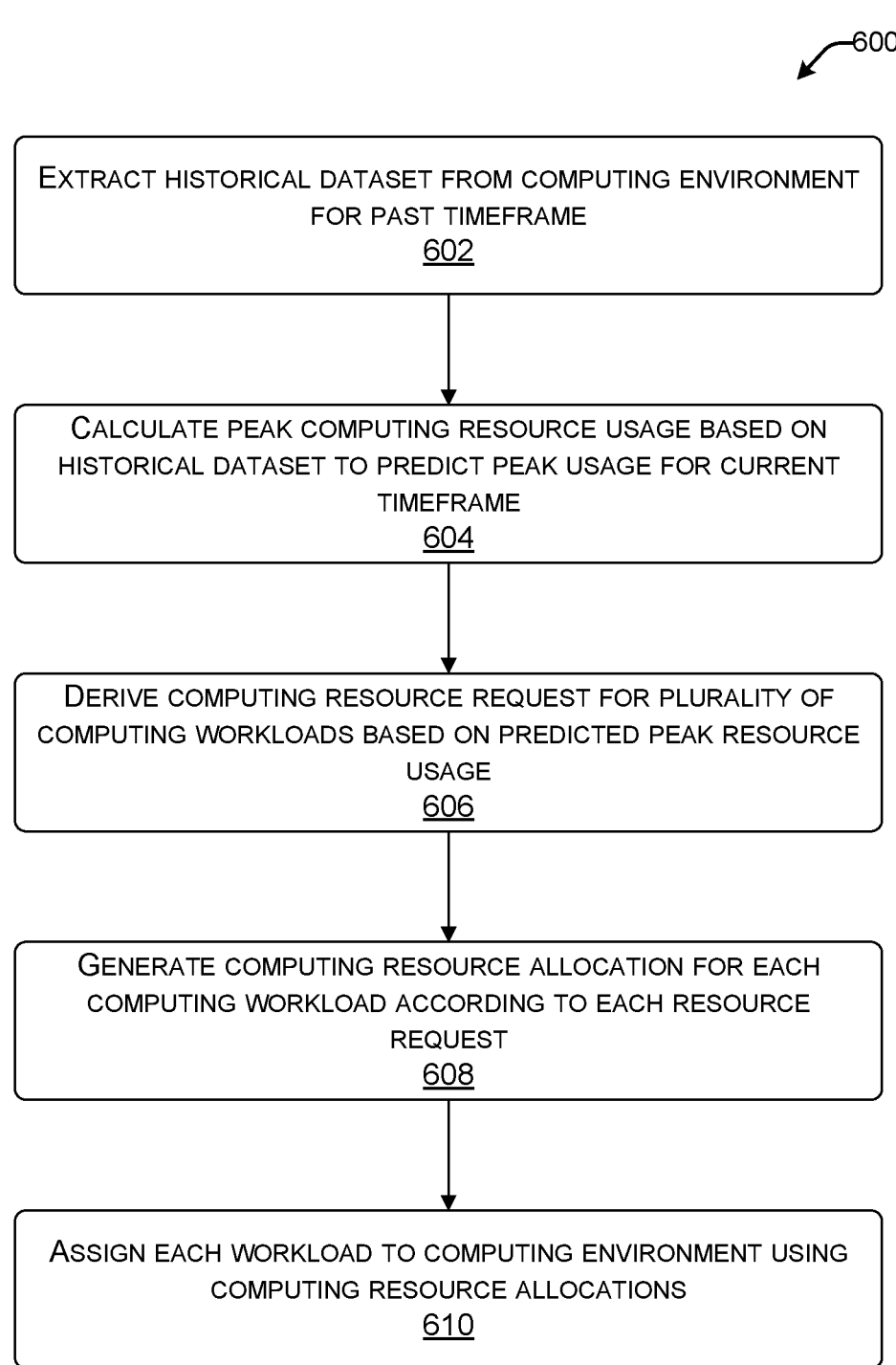
FIG. 6 is a flow diagram showing aspects of a routine for utilizing historical data to predict a peak computing environment resource usage for deriving resource requests.

Turning now to FIG. 6, aspects of a routine 600 for enabling a shared estimator approach for deriving resource requests are shown and described. With reference to FIG. 6, the routine 600 begins at operation 602 where a system extracts a historical dataset from a computing environment defining computing resource usage for a past timeframe.

Next, at operation 604, the system calculates a peak resource usage of the computing environment based on the historical dataset. This peak resource usage is then used as a predicted peak resource usage for a current timeframe.

At operation 606, the system derives computing resource requests for a plurality of computing workloads based on the predicted peak resource usage.

Next, at operation 608, the system generates a computing resource allocation for each computing workload according to the respective resource requests.

Finally, at operation 610, the system assigns the computing workloads to the computing environment using the resource allocations.

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 600 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the described illustration refers to the components of the figures, it should be appreciated that the operations of the routine 600 may be also implemented in many other ways. For example, the routine 600 may be implemented, at least in part, by a processor of another remote computer or a local circuit. In addition, one or more of the operations of the routine 600 may alternatively or additionally be implemented, at least in part, by a chipset working alone or in conjunction with other software modules. In the example described above, one or more modules of a computing system can receive and/or process the data disclosed herein. Any service, circuit or application suitable for providing the techniques disclosed herein can be used in operations described herein.

Figure 7:
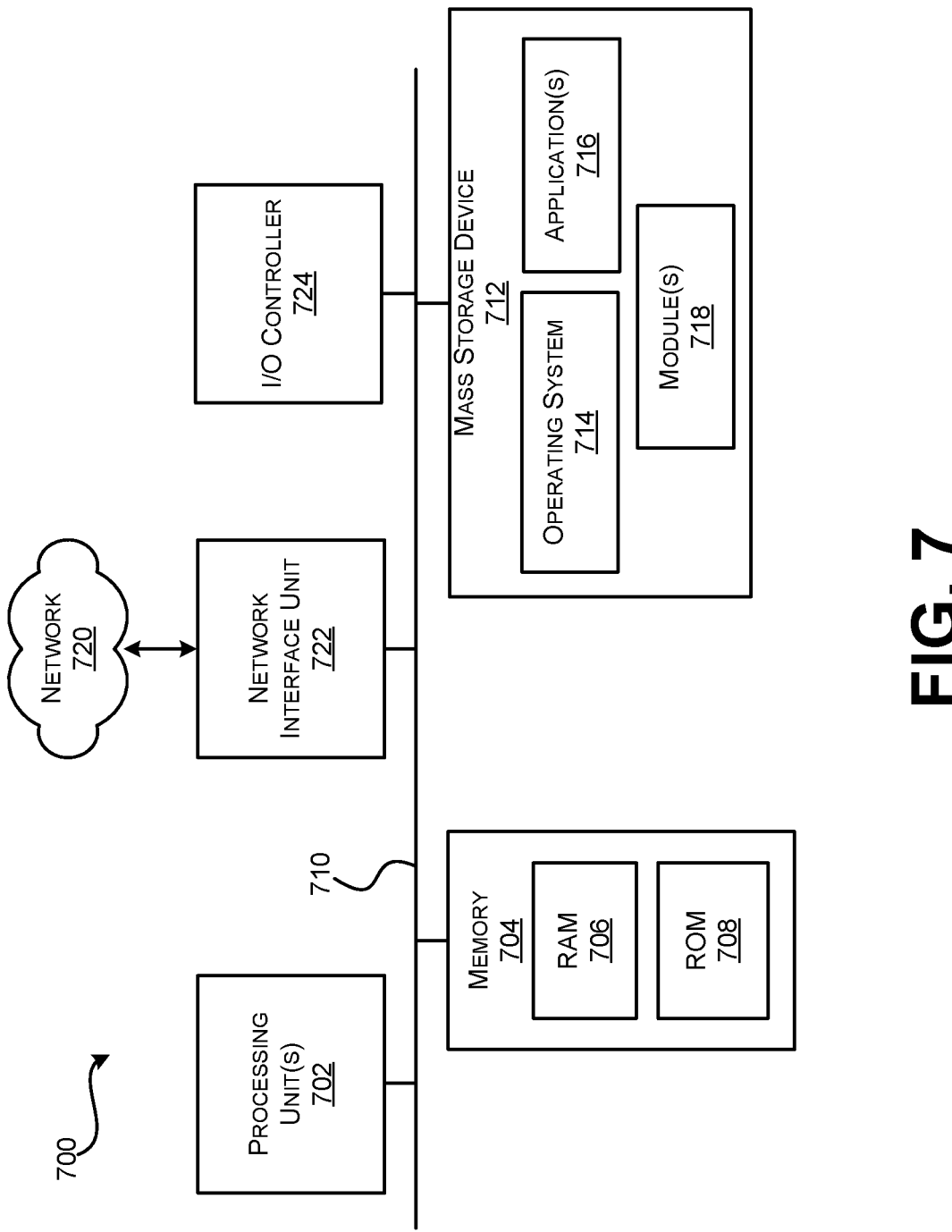
FIG. 7 is a computer architecture diagram showing an illustrative computer hardware and software architecture for a computing system capable of implementing aspects of the techniques and technologies presented herein.

FIG. 7 shows additional details of an example computer architecture 700 for a device, such as a computer or a server configured as part of the cloud-based platform or system, capable of executing computer instructions (e.g., a module or a program component described herein). The computer architecture 700 illustrated in FIG. 7 includes processing unit(s) 702, a system memory 704, including RAM 706 and a read-only memory ("ROM") 708, and a system bus 710 that couples the memory 704 to the processing unit(s) 702. The processing units 702 may also comprise or be part of a processing system. In various examples, the processing units 702 of the processing system are distributed. Stated another way, one processing unit 702 of the processing system may be located in a first location (e.g., a rack within a datacenter) while another processing unit 702 of the processing system is located in a second location separate from the first location.

Processing unit(s), such as processing unit(s) 702, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 700, such as during startup, is stored in the ROM 708. The computer architecture 700 further includes a mass storage device 712 for storing an operating system 714, application(s) 716, modules 718, and other data described herein.

The mass storage device 712 is connected to processing unit(s) 702 through a mass storage controller connected to the bus 710. The mass storage device 712 and its associated computer-readable media provide non-volatile storage for the computer architecture 700. Although the description of computer-readable media contained herein refers to a mass storage device, it should be appreciated by those skilled in the art that computer-readable media can be any available computer-readable storage media or communication media that can be accessed by the computer architecture 700.

Computer-readable media includes computer-readable storage media and/or communication media. Computer-readable storage media include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc ROM (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 700 may operate in a networked environment using logical connections to remote computers through the network 720. The computer architecture 700 may connect to the network 720 through a network interface unit 722 connected to the bus 710. The computer architecture 700 also may include an input/output controller 724 for receiving and processing input from a number of other devices, such as a keyboard, mouse, touch, or electronic stylus or pen. Similarly, the input/output controller 724 may provide output to a display screen, a printer, or other type of output device.

It should be appreciated that the software components described herein may, when loaded into the processing unit(s) 702 and executed, transform the processing unit(s) 702 and the overall computer architecture 700 from a general-purpose computing system into a special-purpose computing system customized to facilitate the functionality presented herein. The processing unit(s) 702 may be constructed from any number of transistors or other discrete circuit elements, which may individually or collectively assume any number of states. More specifically, the processing unit(s) 702 may operate as a finite-state machine, in response to executable instructions contained within the software modules disclosed herein. These computer-executable instructions may transform the processing unit(s) 702 by specifying how the processing unit(s) 702 transition between states, thereby transforming the transistors or other discrete hardware elements constituting the processing unit(s) 702.

Figure 8:
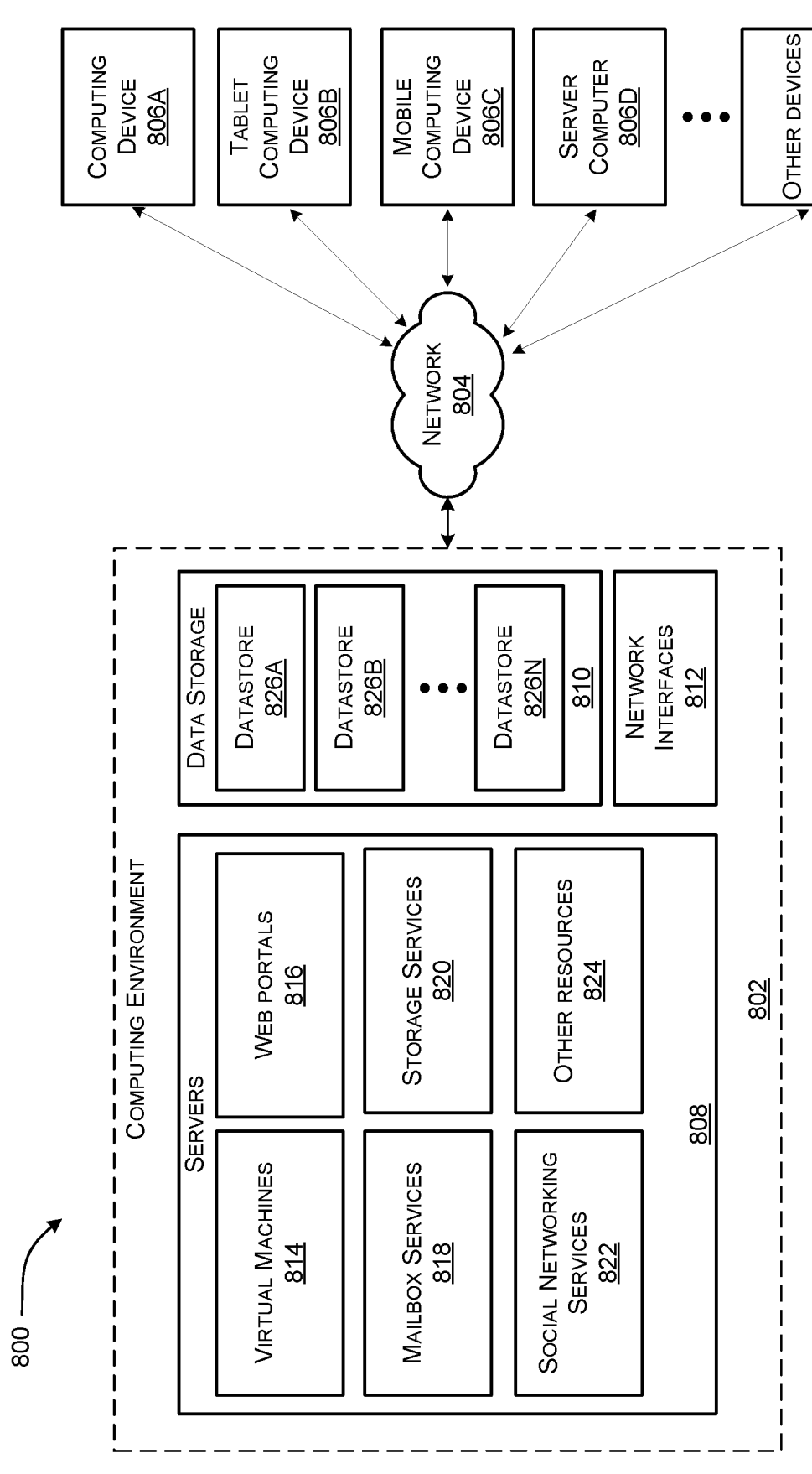
FIG. 8 is a diagram illustrating a distributed computing environment capable of implementing aspects of the techniques and technologies presented herein.

FIG. 8 depicts an illustrative distributed computing environment 800 capable of executing the software components described herein. Thus, the distributed computing environment 800 illustrated in FIG. 8 can be utilized to execute any aspects of the software components presented herein. For example, the distributed computing environment 800 can be utilized to execute aspects of the software components described herein.

Accordingly, the distributed computing environment 800 can include a computing environment 802 operating on, in communication with, or as part of the network 804. The network 804 can include various access networks. One or more computing devices 806A-806N (hereinafter referred to collectively and/or generically as "computing devices 806") can communicate with the computing environment 802 via the network 804. In one illustrated configuration, the computing devices 806 include a computing device 806A such as a laptop computer, a desktop computer, or other computing device; a slate or tablet computing device ("tablet computing device") 806B; a mobile computing device 806C such as a mobile telephone, a smart phone, or other mobile computing device; a server computer 806D; and/or other devices 806N. It should be understood that any number of computing devices 806 can communicate with the computing environment 802.

In various examples, the computing environment 802 includes servers 808, data storage 610, and one or more network interfaces 812. The servers 808 can host various services, virtual machines, portals, and/or other resources. In the illustrated configuration, the servers 808 host virtual machines 814, Web portals 816, mailbox services 818, storage services 820, and/or, social networking services 822. As shown in FIG. 8 the servers 808 also can host other services, applications, portals, and/or other resources ("other resources") 824.

As mentioned above, the computing environment 802 can include the data storage 810. According to various implementations, the functionality of the data storage 810 is provided by one or more databases operating on, or in communication with, the network 804. The functionality of the data storage 810 also can be provided by one or more servers configured to host data for the computing environment 800. The data storage 810 can include, host, or provide one or more real or virtual datastores 826A-826N (hereinafter referred to collectively and/or generically as "datastores 826"). The datastores 826 are configured to host data used or created by the servers 808 and/or other data. That is, the datastores 826 also can host or store web page documents, word documents, presentation documents, data structures, algorithms for execution by a recommendation engine, and/or other data utilized by any application program. Aspects of the datastores 826 may be associated with a service for storing files.

The computing environment 802 can communicate with, or be accessed by, the network interfaces 812. The network interfaces 812 can include various types of network hardware and software for supporting communications between two or more computing devices including the computing devices and the servers. It should be appreciated that the network interfaces 812 also may be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 provides the software functionality described herein as a service to the computing devices. It should be understood that the computing devices can include real or virtual machines including server computers, web servers, personal computers, mobile computing devices, smart phones, and/or other devices. As such, various configurations of the concepts and technologies disclosed herein enable any device configured to access the distributed computing environment 800 to utilize the functionality described herein for providing the techniques disclosed herein, among other aspects.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

The disclosure presented herein also encompasses the subject matter set forth in the following clauses.

Example Clause A, a method comprising: extracting, by a processing system, a historical dataset from a computing environment for a past timeframe, the historical dataset defining computing resource usage for the past timeframe; calculating a peak computing resource usage of the computing environment at a given time based on the historical dataset, wherein the peak computing resource usage represents a predicted peak computing resource usage for a current timeframe; deriving a computing resource request for each computing workload of a plurality of computing workloads based on the predicted peak computing resource usage for the current timeframe; generating a computing resource allocation for each computing workload of the plurality of computing workloads according to the computing resource request derived for each computing workload of the plurality of computing workloads; and assigning each computing workload of the plurality of computing workloads to the computing environment for execution using the computing resource allocation generated for each computing workload of the plurality of computing workloads.

Example Clause B, the method of Example Clause A, wherein: the computing environment comprises a Kubernetes cluster operating a plurality of computing nodes; each computing node of the plurality of computing nodes executes a particular computing workload of the plurality of computing workloads; and each computing workload of the plurality of computing workloads comprises a container.

Example Clause C, the method of Example Clause A or Example Clause B, wherein the peak computing resource usage of the computing environment is calculated by a prophet model configured with the historical dataset.

Example Clause D, the method of any one of Example Clauses A through C, wherein deriving the computing resource request for each computing workload of the plurality of computing workloads comprises dividing the predicted peak computing resource usage by a number of computing workloads of the plurality of computing workloads.

Example Clause E, the method of any one of Example Clauses A through D, wherein the plurality of computing workloads is assigned to the computing environment by a scheduler that is configured with the computing resource allocation generated for each computing workload of the plurality of computing workloads.

Example Clause F, the method of any one of Example Clauses A through E, further comprising: determining that a first resource utilization of a first computing workload of the plurality of computing workloads within a computing node is above a resource utilization threshold; determining that a second resource utilization of a second computing workload of the plurality of computing workloads within the computing node is below the resource utilization threshold; and allocating a portion of computing resources from the second computing workload to the first computing workload based on the first resource utilization of the first computing workload being above the resource utilization threshold and the second resource utilization of the second computing workload being below the resource utilization threshold.

Example Clause G, the method of any one of Example Clauses A through F, further comprising: predicting a peak utilization time for each computing workload of the plurality of computing workloads, wherein the peak utilization time is within the current timeframe; calculating a likelihood that the peak utilization time for a first computing workload overlaps with the peak utilization time for a second computing workload; determining that that the likelihood is greater than a threshold likelihood; and assigning the first computing workload and the second computing workload to different computing nodes within the computing environment.

Example Clause H, the method of any one of Example Clauses A through G, wherein the past timeframe and the current timeframe comprise a same quantity of time.

Example Clause I, the method of any one of Example Clauses A through H, wherein the computing resource request comprises at least one of a requested number of computing cores, a requested amount of memory, or a requested volume of storage.

Example Clause J, a system comprising: a processing system; and a computer-readable storage medium having encoded thereon computer-readable instructions that, when executed by the processing system, cause the system to: extract a historical dataset from a computing environment for a past timeframe, the historical dataset defining computing resource usage for the past timeframe; calculate a peak computing resource usage of the computing environment at a given time based on the historical dataset, wherein the peak computing resource usage represents a predicted peak computing resource usage for a current timeframe; derive a computing resource request for each computing workload of a plurality of computing workloads based on the predicted peak computing resource usage for the current timeframe; generate a computing resource allocation for each computing workload of the plurality of computing workloads according to the computing resource request derived for each computing workload of the plurality of computing workloads; and assign each computing workload of the plurality of computing workloads to the computing environment for execution using the computing resource allocation generated for each of the plurality of computing workloads.

Example Clause K, the system of Example Clause J, wherein: the computing environment comprises a Kubernetes cluster operating a plurality of computing nodes; each computing node of the plurality of computing nodes executes a particular computing workload of the plurality of computing workloads; and each computing workload of the plurality of computing workloads comprises a container.

Example Clause L, the system of Example Clause J or Example Clause K, wherein the peak computing resource usage of the computing environment is calculated by a prophet model configured with the historical dataset.

Example Clause M, the system of any one of Example Clauses J through L, wherein deriving the computing resource request for each computing workload of the plurality of computing workloads comprises dividing the predicted peak computing resource usage by a number of computing workloads of the plurality of computing workloads.

Example Clause N, the system of any one of Example Clauses J through M, wherein the plurality of computing workloads is assigned to the computing environment by a scheduler that is configured with the computing resource allocation generated for each of the plurality of computing workloads.

Example Clause O, the system of any one of Example Clauses J through N, wherein the computer-readable instructions further cause the system to: determine that a first resource utilization of a first computing workload of the plurality of computing workloads within a computing node is above a resource utilization threshold; determine that a second resource utilization of a second computing workload of the plurality of computing workloads within the computing node is below the resource utilization threshold; and allocate a portion of computing resources from the second computing workload to the first computing workload based on the first resource utilization of the first computing workload being above the resource utilization threshold and the second resource utilization of the second computing workload being below the resource utilization threshold.

Example Clause P, the system of any one of Example Clauses J through O, wherein the computer-readable instructions further cause the system to: predict a peak utilization time for each computing workload of the plurality of computing workloads, wherein the peak utilization time is within the current timeframe; calculate a likelihood that the peak utilization time for a first computing workload overlaps with the peak utilization time for a second computing workload; determine that that the likelihood is greater than a threshold likelihood; and assign the first computing work load and the second computing workload to different computing nodes within the computing environment.

Example Clause Q, the system of any one of Example Clauses J through P, wherein the past timeframe and the current timeframe comprise a same quantity of time.

Example Clause R, the system of any one of Example Clauses J through Q, wherein the computing resource request comprises at least one of a requested number of computing cores, a requested amount of memory, or a requested volume of storage.

Example Clause S, a computer-readable storage medium having encoded thereon computer-readable instructions that when executed by a processing system cause a system to: extract a historical dataset from a computing environment for a past timeframe, the historical dataset defining computing resource usage for the past timeframe; calculate a peak computing resource usage of the computing environment at a given time based on the historical dataset, wherein the peak computing resource usage represents a predicted peak computing resource usage for a current timeframe; derive a computing resource request for each computing workload of a plurality of computing workloads based on predicted peak computing resource usage for the current timeframe; generate a computing resource allocation for each computing workload of the plurality of computing workloads according to the computing resource request derived for each computing workload of the plurality of computing workloads; and assign each computing workload of the plurality of computing workloads to the computing environment for execution using the computing resource allocation generated for each computing workload of the plurality of computing workloads.

Example Clause T, the computer-readable storage medium of Example Clause S, wherein the computer-readable instructions further cause the system to: determine that a first resource utilization of a first computing workload of the plurality of computing workloads within a computing node is above a resource utilization threshold; determine that a second resource utilization of a second computing workload of the plurality of computing workloads within the computing node is below the resource utilization threshold; and allocate a portion of computing resources from the second computing workload to the first computing workload based on the first resource utilization of the first computing workload being above the resource utilization threshold and the second resource utilization of the second computing workload being below the resource utilization threshold.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different computing workloads).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for automated computing resource reallocation in a cluster operating a plurality of computing nodes executing a plurality of computing workloads, the method comprising:

extracting, by a processing system executing a predictive model, a historical dataset from the cluster operating the plurality of computing nodes for a past timeframe, the historical dataset defining computing resource usage of the cluster operating the plurality of computing nodes during the past timeframe;

calculating, by execution of the predictive model, a peak computing resource usage of the cluster operating the plurality of computing nodes at a given time based on the historical dataset, wherein the peak computing resource usage represents a predicted peak computing resource usage for a current timeframe;

deriving a computing resource request for each computing workload of the plurality of computing workloads to be deployed to the cluster operating the plurality of computing nodes based on the predicted peak computing resource usage for the current timeframe;

generating a computing resource allocation for each computing workload of the plurality of computing workloads to be deployed to the cluster operating the plurality of computing nodes according to the computing resource request derived for each computing workload of the plurality of computing workloads;

assigning, as part of a computing workload deployment, each computing workload of the plurality of computing workloads to the cluster operating the plurality of computing nodes for execution using the computing resource allocation generated for each computing workload of the plurality of computing workloads;

determining, during execution of a first computing workload, that a first resource utilization of the first computing workload within a computing node operating within the cluster is above a resource utilization threshold;

determining, during execution of a second computing workload, that a second resource utilization of the second computing workload within the computing node operating within the cluster is below the resource utilization threshold; and reallocating at least one of a computing core, an amount of memory, or a volume of storage from the second computing workload to the first computing workload based on the first resource utilization being above the resource utilization threshold and the second resource utilization being below the resource utilization threshold.

2. The method of claim 1, wherein:

the cluster operating the plurality of computing nodes comprises a Kubernetes cluster; and each computing workload of the plurality of computing workloads comprises a container.

3. The method of claim 1, wherein the peak computing resource usage of the cluster operating the plurality of computing nodes is calculated by a prophet model configured with the historical dataset.

4. The method of claim 1, wherein deriving the computing resource request for each computing workload of the plurality of computing workloads comprises dividing the predicted peak computing resource usage by a number of computing workloads of the plurality of computing workloads.

5. The method of claim 1, wherein the plurality of computing workloads is assigned to the cluster operating the plurality of computing nodes by a scheduler that is configured with the computing resource allocation generated for each computing workload of the plurality of computing workloads.

6. The method of claim 1, further comprising:

predicting a peak utilization time for each computing workload of the plurality of computing workloads, wherein the peak utilization time is within the current timeframe;

calculating a likelihood that the peak utilization time for a third computing workload overlaps with the peak utilization time for a fourth computing workload;

determining that the likelihood is greater than a threshold likelihood; and assigning the third computing workload and the fourth computing workload to different computing nodes within the cluster operating the plurality of computing nodes in response to determining that the likelihood is greater than the threshold likelihood.

7. The method of claim 1, wherein the past timeframe and the current timeframe comprise a same quantity of time.

8. The method of claim 1, wherein the computing resource request comprises at least one of a requested number of computing cores, a requested amount of memory, or a requested volume of storage.

9. A system for automated computing resource reallocation in a cluster operating a plurality of computing nodes executing a plurality of computing workloads, the system comprising:

a processing unit; and a computer-readable storage medium having encoded thereon computer-readable instructions that, when executed by the processing unit, cause the system to:

extract a historical dataset from the cluster operating the plurality of computing nodes for a past timeframe, the historical dataset defining computing resource usage of the cluster operating the plurality of computing nodes during the past timeframe;

calculate, by execution of a predictive model, a peak computing resource usage of the cluster operating the plurality of computing nodes at a given time based on the historical dataset, wherein the peak computing resource usage represents a predicted peak computing resource usage for a current timeframe;

derive a computing resource request for each computing workload of the plurality of computing workloads to be deployed to the cluster operating the plurality of computing nodes based on the predicted peak computing resource usage for the current timeframe;

generate a computing resource allocation for each computing workload of the plurality of computing workloads to be deployed to the cluster operating the plurality of computing nodes according to the computing resource request derived for each computing workload of the plurality of computing workloads;

assign, as part of a computing workload deployment, each computing workload of the plurality of computing workloads to the cluster operating the plurality of computing nodes for execution using the computing resource allocation generated for each of the plurality of computing workloads;

determine, during execution of a first computing workload, that a first resource utilization of the first computing workload within a computing node operating within the cluster is above a resource utilization threshold;

determine, during execution of a second computing workload, that a second resource utilization of the second computing workload within the computing node operating within the cluster is below the resource utilization threshold; and reallocate at least one of a computing core, an amount of memory, or a volume of storage from the second computing workload to the first computing workload based on the first resource utilization being above the resource utilization threshold and the second resource utilization being below the resource utilization threshold.

10. The system of claim 9, wherein:

the cluster operating the plurality of computing nodes comprises a Kubernetes cluster; and each computing workload of the plurality of computing workloads comprises a container.

11. The system of claim 9, wherein the peak computing resource usage of the cluster operating the plurality of computing nodes is calculated by a prophet model configured with the historical dataset.

12. The system of claim 9, wherein deriving the computing resource request for each computing workload of the plurality of computing workloads comprises dividing the predicted peak computing resource usage by a number of computing workloads of the plurality of computing workloads.

13. The system of claim 9, wherein the plurality of computing workloads is assigned to the cluster operating the plurality of computing nodes by a scheduler that is configured with the computing resource allocation generated for each of the plurality of computing workloads.

14. The system of claim 9, wherein the computer-readable instructions further cause the system to:

predict a peak utilization time for each computing workload of the plurality of computing workloads, wherein the peak utilization time is within the current timeframe;

calculate a likelihood that the peak utilization time for a third computing workload overlaps with the peak utilization time for a fourth computing workload;

determine that the likelihood is greater than a threshold likelihood; and assign the third computing workload and the fourth computing workload to different computing nodes within the cluster operating the plurality of computing nodes in response to determining that the likelihood is greater than the threshold likelihood.

15. The system of claim 9, wherein the past timeframe and the current timeframe comprise a same quantity of time.

16. The system of claim 9, wherein the computing resource request comprises at least one of a requested number of computing cores, a requested amount of memory, or a requested volume of storage.

17. A computer-readable storage medium for automated computing resource reallocation in a cluster operating the plurality of computing nodes executing a plurality of computing workloads, the computer-readable storage medium having encoded thereon computer-readable instructions that, when executed by a processing unit, cause a system to:

extract a historical dataset from the cluster operating the plurality of computing nodes for a past timeframe, the historical dataset defining computing resource usage of the cluster operating the plurality of computing nodes during the past timeframe;

calculate, by execution of a predictive model, a peak computing resource usage of the cluster operating the plurality of computing nodes at a given time based on the historical dataset, wherein the peak computing resource usage represents a predicted peak computing resource usage for a current timeframe;

derive a computing resource request for each computing workload of the plurality of computing workloads to be deployed to the cluster operating the plurality of computing nodes based on the predicted peak computing resource usage for the current timeframe;

generate a computing resource allocation for each computing workload of the plurality of computing workloads to be deployed to the cluster operating the plurality of computing nodes according to the computing resource request derived for each computing workload of the plurality of computing workloads;

assign, as part of a computing workload deployment, each computing workload of the plurality of computing workloads to the cluster operating the plurality of computing nodes for execution using the computing resource allocation generated for each of the plurality of computing workloads;

determine, during execution of a first computing workload, that a first resource utilization of the first computing workload within a computing node operating within the cluster is above a resource utilization threshold;

determine, during execution of a second computing workload, that a second resource utilization of the second computing workload within the computing node operating within the cluster is below the resource utilization threshold; and reallocate at least one of a computing core, an amount of memory, or a volume of storage from the second computing workload to the first computing workload based on the first resource utilization being above the resource utilization threshold and the second resource utilization being below the resource utilization threshold.

18. The computer-readable storage medium of claim 17, wherein the peak computing resource usage of the cluster operating the plurality of computing nodes is calculated by a prophet model configured with the historical dataset.

19. The computer-readable storage medium of claim 17, wherein deriving the computing resource request for each computing workload of the plurality of computing workloads comprises dividing the predicted peak computing resource usage by a number of computing workloads of the plurality of computing workloads.

20. The computer-readable storage medium of claim 17, wherein the computer-readable instructions further cause the system to:

predict a peak utilization time for each computing workload of the plurality of computing workloads, wherein the peak utilization time is within the current timeframe;

calculate a likelihood that the peak utilization time for a third computing workload overlaps with the peak utilization time for a fourth computing workload;

determine that the likelihood is greater than a threshold likelihood; and assign the third computing workload and the fourth computing workload to different computing nodes within the cluster operating the plurality of computing nodes in response to determining that the likelihood is greater than the threshold likelihood.

* * * * *